US009761103B2

(12) United States Patent
Chen et al.

(10) Patent No.: US 9,761,103 B2
(45) Date of Patent: Sep. 12, 2017

(54) PORTABLE TERMINAL HAVING VIDEO SURVEILLANCE APPARATUS, VIDEO SURVEILLANCE METHOD USING THE PORTABLE TERMINAL, AND VIDEO SURVEILLANCE SYSTEM

(75) Inventors: Maolin Chen, Yongin-si (KR); Young-su Moon, Seoul (KR); Jun-mo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1933 days.

(21) Appl. No.: 11/785,763

(22) Filed: Apr. 19, 2007

(65) Prior Publication Data

US 2008/0111883 A1 May 15, 2008

(30) Foreign Application Priority Data

Nov. 13, 2006 (KR) ........................ 10-2006-0111889

(51) Int. Cl.
*H04N 7/18* (2006.01)
*G08B 13/196* (2006.01)

(52) U.S. Cl.
CPC . *G08B 13/19621* (2013.01); *G08B 13/19602* (2013.01); *G08B 13/19658* (2013.01)

(58) Field of Classification Search
CPC ........ G08B 13/19602; G08B 13/19658; G08B 13/19621
USPC ................ 348/143, 152, 154, 155, 169, 352
See application file for complete search history.

(56) References Cited

U.S. PATENT DOCUMENTS

| | | | | |
|---|---|---|---|---|
| 7,131,136 | B2 * | 10/2006 | Monroe | G08B 13/19641 340/945 |
| 7,447,334 | B1 * | 11/2008 | Jiang et al. | 382/103 |
| 7,613,730 | B2 * | 11/2009 | Idehara et al. | |
| 7,777,780 | B2 * | 8/2010 | Oya et al. | 348/208.1 |
| 8,589,994 | B2 * | 11/2013 | Monroe | G08B 13/19641 340/945 |
| 2003/0151062 | A1 * | 8/2003 | Cho | 257/185 |
| 2003/0174210 | A1 * | 9/2003 | Vimpari et al. | 348/152 |
| 2004/0008253 | A1 * | 1/2004 | Monroe | G08B 13/19641 348/143 |
| 2004/0252197 | A1 * | 12/2004 | Fraley et al. | 348/207.1 |
| 2005/0276446 | A1 | 12/2005 | Chen et al. | |
| 2006/0061654 | A1 * | 3/2006 | McKay et al. | 348/143 |
| 2006/0147108 | A1 | 7/2006 | Kee et al. | |

(Continued)

FOREIGN PATENT DOCUMENTS

| | | |
|---|---|---|
| CN | 1633139 | 6/2005 |
| KR | 2003-0067212 | 8/2003 |
| KR | 10-2005-011906 | 12/2005 |

OTHER PUBLICATIONS

Office Action issued in corresponding Korean Patent Application No. 10-2006-0111889, mailed on Oct. 30, 2008.

*Primary Examiner* — Kenneth R Coulter
(74) *Attorney, Agent, or Firm* — NSIP Law

(57) ABSTRACT

Provided is an image surveillance method and apparatus. The image surveillance method includes photographing a predetermined place and generating an image signal corresponding to the predetermined place, detecting a change in the image signal by calculating a difference between a current frame and a previous frame of the generated image signal, and generating alarm information corresponding to the detected change in the image signal in order to alarm a user.

20 Claims, 8 Drawing Sheets

(56) References Cited

U.S. PATENT DOCUMENTS

| | | | | |
|---|---|---|---|---|
| 2006/0152594 | A1 | 7/2006 | Landschaft et al. | |
| 2007/0174881 | A1* | 7/2007 | Idehara et al. | 725/90 |
| 2007/0182818 | A1* | 8/2007 | Buehler | 348/143 |
| 2008/0007402 | A1* | 1/2008 | Cheng | 340/541 |
| 2008/0024612 | A1* | 1/2008 | Oya et al. | 348/207.1 |
| 2012/0140068 | A1* | 6/2012 | Monroe | H04N 7/183<br>348/143 |

* cited by examiner

PORTABLE TERMINAL HAVING VIDEO SURVEILLANCE APPARATUS, VIDEO SURVEILLANCE METHOD USING THE PORTABLE TERMINAL, AND VIDEO SURVEILLANCE SYSTEM

CROSS-REFERENCE TO RELATED PATENT APPLICATION

This application claims the benefit of Korean Patent Application No. 10-2006-0111889, filed on Nov. 13, 2006, in the Korean Intellectual Property Office, the disclosure of which is incorporated herein in its entirety by reference.

BACKGROUND OF THE INVENTION

1. Field of the Invention

The present invention relates to image analysis for surveilling objects or occurrences, and more particularly, to a video surveillance method and apparatus using a portable terminal having a camera module mounted in the portable terminal.

2. Description of the Related Art

With the increase of crimes such as murder, robberies, and arson, security has become a major issue. Many solutions to prevent crimes have been suggested and implemented in public places and one of the solutions is a video surveillance system including a plurality of cameras that is installed in buildings and roads. An example of conventional video surveillance systems is a digital video recorder (DVR) including a computer, cameras, a data transmission cable, and a display device. The cameras of the video surveillance systems are fixed in order to photograph specific places and capture and transmit photographed image sequences that are to be displayed on the display device.

The video surveillance systems are operated by security operators who design a surveillance solution, install the system, and designate a place that is to be surveilled. The security operators manage the video surveillance systems and record photographed images on a storage device, so that the stored photographed images can be retrieved anytime in order to be viewed.

The security of private places as well as public places needs to be guaranteed such that the private places cannot be surveilled by security operators for personal reasons.

Thus, individuals have become responsible for the design and management of their own surveillance systems. However, these types of surveillance systems are implemented at a high cost and occupy a large amount of space. Furthermore, the installation of the surveillance systems is tedious and not user friendly. Moreover, it is not possible for individuals to conduct surveillance to the same effectiveness as professional security operators.

SUMMARY OF THE INVENTION

The present invention provides a portable terminal including a video surveillance apparatus, which can flexibly perform image surveillance according to the settings of a user, can be used by common users, and can solve problems associated with surveillance of privacy protection areas.

The present invention also provides an effective video surveillance method using the portable terminal.

The present invention also provides a video surveillance system capable of performing video surveillance using the portable terminal and a wired or wireless communication network.

According to one aspect of the present invention, there is provided a video surveillance method including photographing a predetermined place and generating an image signal corresponding to the predetermined place, detecting a change in the image signal by calculating a difference between a current frame and a previous frame of the generated image signal, and generating alarm information corresponding to the detected change in the image signal in order to alarm a user.

According to another aspect of the present invention, there is provided a portable terminal including an image generation unit photographing a predetermined place and generating an image signal corresponding to the predetermined place, a calculation unit calculating a difference between a current frame and a previous frame of the generated image signal and detecting a change in the image signal based on the calculation result, a control unit generating alarm information corresponding to the detected change in the image signal and outputting the generated alarm information, and an alarm unit alarming a user according to the alarm information output from the control unit.

According to another aspect of the present invention, there is provided a portable terminal including a camera and a video surveillance apparatus. The video surveillance apparatus includes an image generation unit photographing a predetermined place and generating an image signal corresponding to the predetermined place, a calculation unit calculating a difference between a current frame and a previous frame of the generated image signal and detecting a change in the image signal based on the calculation result, a control unit generating alarm information corresponding to the detected change in the image signal and outputting the generated alarm information, and an alarm unit alarming a user according to the alarm information output from the control unit.

According to another aspect of the present invention, there is provided a video surveillance system including the portable terminal, a first terminal connected with the portable terminal through a wireless network, and a second terminal connected with the portable terminal by a communication server through a wired/wireless network.

According to another aspect of the present invention, there is provided a recording medium capable of executing a program for implementing the video surveillance method on a computer.

The details and improvements of the present invention are disclosed in dependent claims.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
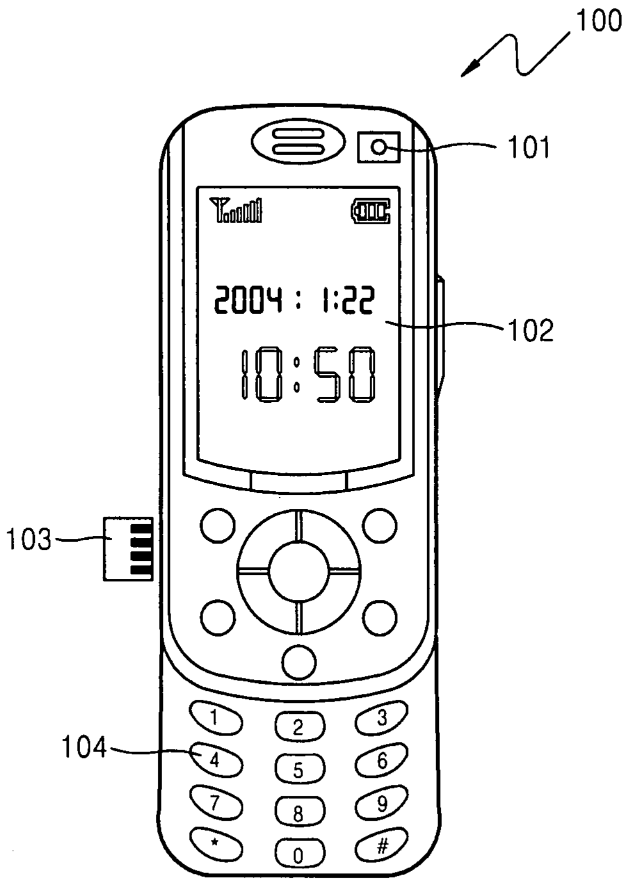
FIG. 1 illustrates a schematic view of a portable terminal having a video surveillance apparatus, according to an embodiment of the present invention.

FIG. 1 illustrates a schematic view a portable terminal 100 including an image surveillance apparatus 103, according to an embodiment of the present invention.

Referring to FIG. 1, the portable terminal 100 is manufactured as a conventional portable terminal that may be a handheld device such as a cellular phone or a personal digital assistant (PDA). The portable terminal 100 includes a camera 101, a display screen 102, and a keyboard 104. In particular, the portable terminal 100 includes the image surveillance apparatus 103 in the form of an integrated circuit in its body in order to perform functions according to the present invention. The image surveillance apparatus 103 may include an image generation unit 300 which may include an image circuit, a change detection unit 410 which may include a change detection circuit, an object detection unit 420 which may include an object detection circuit, a control unit 340 which may include a control circuit, and an alarm unit 360 which may include an alarm circuit, as will be described with reference to FIGS. 3 through 9.

Figure 2:
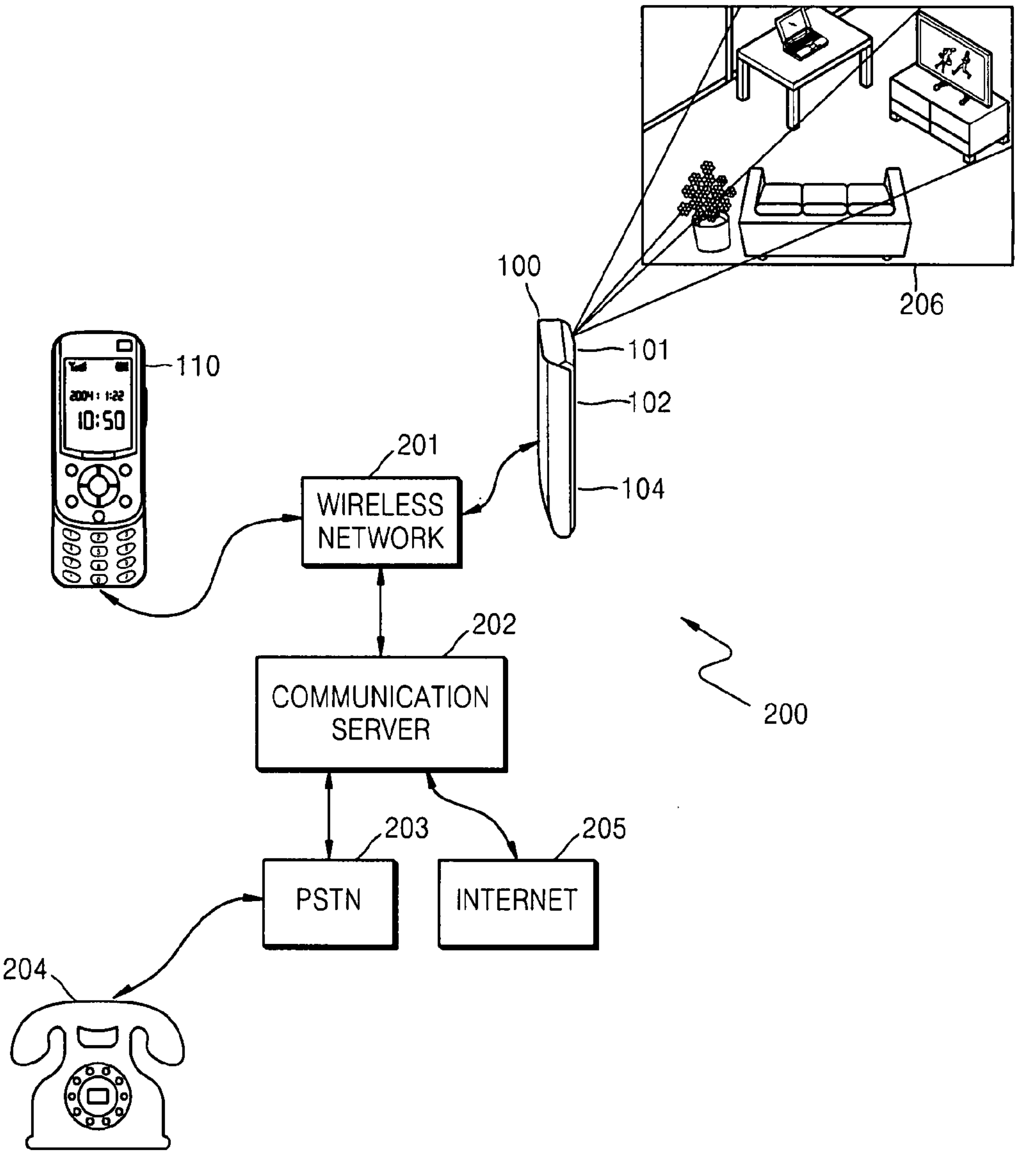
FIG. 2 is a block diagram of a video surveillance system used in the portable terminal illustrated in FIG. 1, according to an embodiment of the present invention.

FIG. 2 is a block diagram of an image surveillance system 200 used in the portable terminal 100 illustrated in FIG. 1, according to an embodiment of the present invention.

In FIG. 2, the portable terminal 100, a wireless network 201, a communication server 202, a public switched telephone network (PSTN) network 203, an Internet network 205, a first terminal 110, a second terminal 204, and a surveillance scene 206 are illustrated.

The wireless network 201 includes a configuration capable of performing wireless communication and a base transceiver station (BTS), a base station controller (BSC), a mobile switch center (MSC), a home location register (HLR), and a 2G and 3G code divisional multiplexing access (CDMA) group and a global system for mobile communication (GSM) group. In the present embodiment of the present invention, a configuration capable of transmitting information about a changed image or an object included in an image in a place under surveillance using a multimedia message is further included. For example, the portable terminal 100 may transmit a multimedia messaging service (MMS) message to another portable terminal through an MMS server (not shown).

The communication server 202 serves as a gateway for enabling communication between the wireless network 201 and a wired network such as the PSTN network 203, which is a conventional phone network, and the Internet network 205, and may be operated by a common carrier.

The first terminal 110 may be a conventional mobile terminal of the same type as the portable terminal 100. The second terminal 204 may be a conventional wired telephone and a personal computer (PC) (not shown) connected to the Internet network 205 may also be an alarm-receiving terminal.

The surveillance scene 206 is an image of a place that is photographed by the camera 101 of the portable terminal 100, that is, preferably a place that requires privacy protection, such as a space at home.

The portable terminal 100 is placed in a specific place as illustrated in FIG. 2, and the image surveillance apparatus 103 of the portable terminal 100 analyzes images captured by the camera 101 of the portable terminal 100, automatically determines whether to react in a manner desired by a user, and transmits a signal through the wireless network 201. The image surveillance apparatus 103 transmits the signal through the wireless network 201 or through the wireless network 201 by using switching of the communication server 202 located between the wireless network 201 and the PSTN network 203 according to whether a target receiver is a portable phone according to an embodiment of the present invention, another portable phone, a conventional telephone, or a PC. Optionally, the image surveillance apparatus 103 may transmit the signal to an Internet user terminal (not shown), e.g., a PC, through the Internet network 205 and inform target users in various forms such as an instant message or an e-mail.

Figure 3:
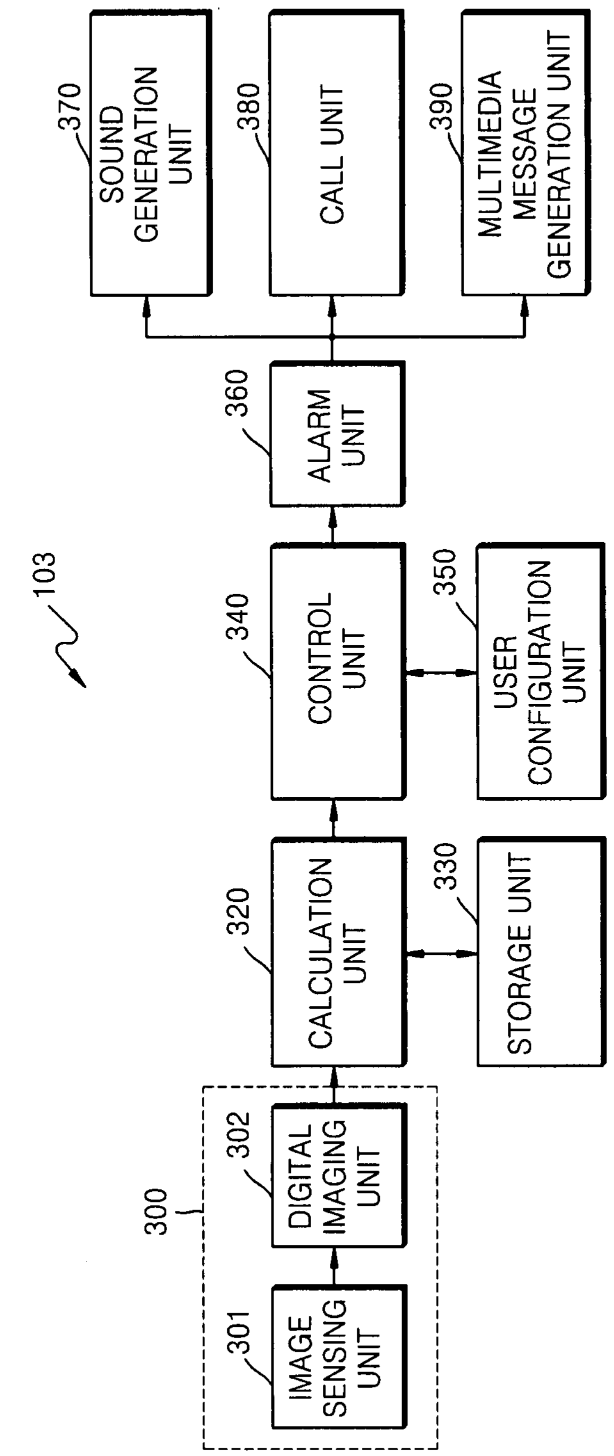
FIG. 3 is a schematic block diagram of a video surveillance apparatus of the portable terminal illustrated in FIG. 1, according to an embodiment of the present invention.

FIG. 3 is a schematic block diagram of the image surveillance apparatus 103 of the portable terminal 100 illustrated in FIG. 1, according to an embodiment of the present invention. Referring to FIG. 3, the image surveillance apparatus 103 includes an image generation unit 300, a calculation unit 320, a storage unit 330, a control unit 340, a user setting unit 350, an alarm unit 360, a sound generation unit 370, a call unit 380, and a multimedia message generation unit 390.

The image generation unit 300 further includes an image sensing unit 301 and a digital imaging unit 302. The image sensing unit 301 photographs a specific place with the camera 101 to obtain an image signal. The image sensing unit 301 may be, for example, an image sensor of a charge-coupled device (CCD) or a complementary metal-oxide-semiconductor (CMOS) type. The digital imaging unit 302 receives the image signal from the image sensing unit 301 in order to improve image quality, and removes noise from the image signal. The digital imaging unit 302 also processes an analog image signal photographed by the camera 101 into a digital image signal and provides the digital image signal to the calculation unit 320 for image analysis. Although the image sensing unit 301 and the digital imaging unit 302 are separated from each other in the present embodiment of the present invention, the image sensing unit 301 and the digital imaging unit 302 may also be implemented as one unit.

The calculation unit 320 calculates a change of the digital image signal input from the digital imaging unit 302 and detects a change of the digital image signal according to a change in a place based on the calculation result. The calculation of the change of the digital image signal input from the digital imaging unit 302 is related to calculating a difference between frames of the digital input image signal, i.e., a difference between a current frame and a previous frame of the digital input image signal. The detailed configuration and function of the calculation unit 320 will be described later with reference to FIGS. 4 and 5.

The storage unit 330 stores temporary data for a process performed by the calculation unit 320, the calculation result of the calculation unit 320, and image data. In particular, the storage unit 330 stores information about a point of interest in a place under surveillance or an object that exists in or emerges from the point of interest, such as information about a person or a thing, or changed image information.

The control unit 340 generates alarm information corresponding to a change in a place based on user information and controls the generated alarm information. The control unit 340 may receive, for example, information about a point of interest in a place that is to be under surveillance, an object that exists in the point of interest in the place that is to be under surveillance, a phone number of the user that is to be called, or an alarm method, as the user information from the user setting unit 350, and determines a signal processing method according to the desires of the user. When the control unit 340 receives the calculation result from the calculation unit 320, the control unit 340 determines whether to transmit a signal to the user and a way to transmit the signal.

The alarm unit 360 alarms the user according to alarm information input from the control unit 340. The alarm information input from the control unit 340 includes an alarm method that is previously set by the user or a phone number of the user. In other words, the alarm unit 360 transmits an alarm signal to the user in several ways under the control of the control unit 340. The alarm signal may be transmitted to the user through three configurations such as the sound generation unit 370 for generating a sound that calls the attention of the user, the call unit 380 for calling the user, and the message generation unit 390 for transmitting a multimedia message to the user.

Figure 4:
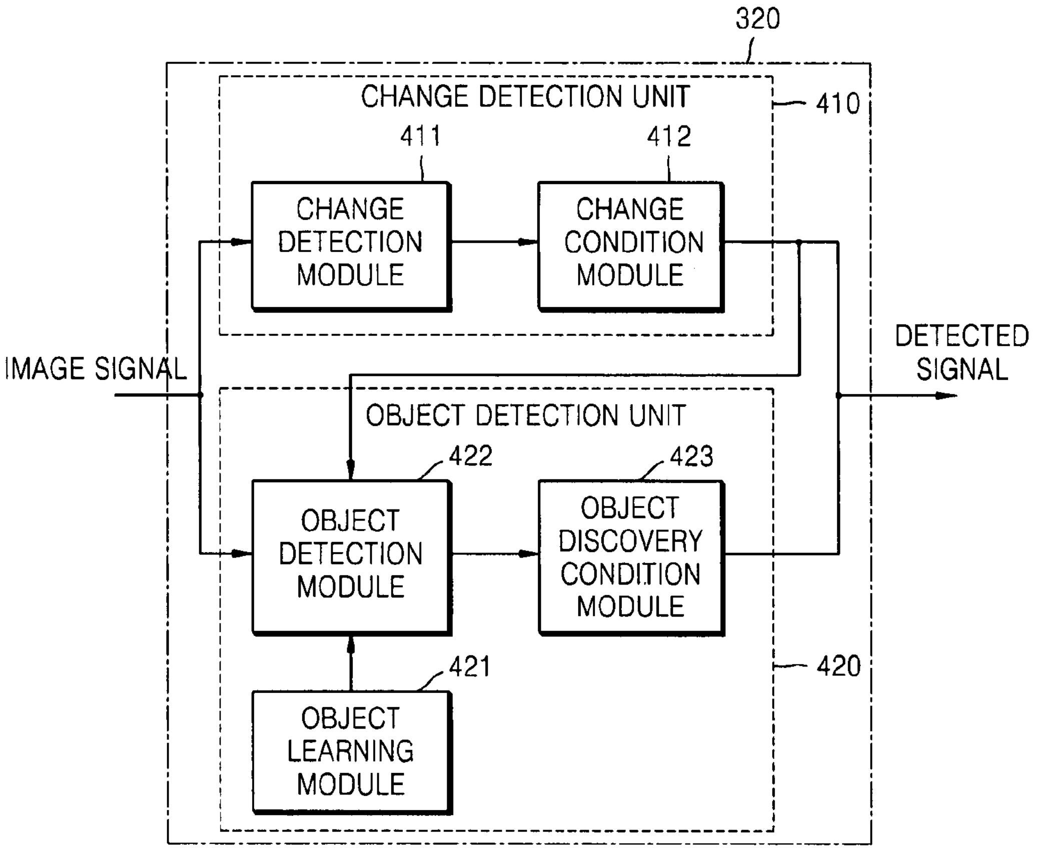
FIG. 4 is a block diagram of a calculation unit of the video surveillance apparatus illustrated in FIG. 3.

FIG. 4 is a block diagram of the calculation unit 320 of the image surveillance apparatus 103 illustrated in FIG. 3.

Referring to FIG. 4, the calculation unit 320 receives digital image signals from the digital imaging unit 302 and calculates the calculation result indicating whether or not images are changed, where the images are changed, whether or not objects are discovered, and where the objects are discovered.

The calculation unit 320 includes a change detection unit 410 and an object detection unit 420.

The change detection unit 410 receives the digital image signal that results from photographing a specific place, detects a change in the place, and determines whether the change occurs in a point of interest that is previously set by the user. When there is no point of interest that is previously set by the user, the entire observed image area is set as the point of interest. In other words, the key function of the change detection unit 410 is to detect a change in the point of interest.

The change detection unit 410 includes a change detection module 411 and a change condition module 412.

The change detection module 411 receives digital image signals, learns a background model, and compares the input image with the background model to detect changed pixels, as will be described later with reference to FIG. 5.

The change condition module 412 checks which pixels are changed in the point of interest and determines whether the degree of change of the pixels in the point of interest is greater than a predetermined threshold based on information about the changed pixels and information about the set point of interest by the user, which are received from the change detection module 411. A detailed embodiment of the determination can be found in U.S Patent Application No. 2005-276446A1. When it is determined that pixels have changed in the point of interest to a degree that is greater than the predetermined threshold, the change condition module 412 transmits an image signal (see F below) to the control unit 340 for generation of alarm information. The change condition module 412 also provides information about the changed pixels in the point of interest to the object detection unit 420.

The object detection unit 420 receives an image signal and information provided from the change condition module 412, i.e., information about which pixels in the point of interest are changed, detects an object, and determines whether the detected object satisfies an object discovery condition that is set by the user. The object detection unit 420 includes an object learning module 421, an object detection module 422, and an object discovery condition module 423, as will be described later with reference to FIG. 7.

The portable terminal 100 including the image surveillance apparatus 103 is capable of monitoring the entire area of a place under surveillance or monitoring several small areas from which the user can divide the entire area. More specifically, the user can divide the entire area of the place under surveillance into a plurality of small areas by checking a plurality of lattice scales drawn on an image using a keyboard of the portable terminal 100. For example, the user moves a cursor to the left, to the right, up, and down to a desired lattice scale and then presses '1' for check in or presses '0' for check out. The number of lattice scales may be may be a final place under surveillance. The user can define the number of lattice scales indicating the resolution of the lattice scales in the horizontal direction and the vertical direction of the image.

The portable terminal 100 including the image surveillance apparatus 103 can detect a change in a place under surveillance using the change detection unit 410 and dispose an existing object on changed pixels.

When the surveillance scene 206 is divided into the small areas by the user, the user may check changed lattice scales to determine whether the surveillance scene 206 is filled with objects including at least one of the lattice scales, or objects of interest. For example, when a fire occurs or a smoke is generated, the degree of the fire or smoke can be sensed according to the present invention. Moreover, the portable terminal 100 including the image surveillance apparatus 103 can check whether an object actually exists on changed pixels using the object detection unit 420. There are many reasons that can cause a change in an image or an image area and the user may only desire one of those reasons. Some of the reasons may be filtered by area division in order to determine whether the areas include one object of interest or a plurality of objects of interest.

The existence of an object in the space under surveillance can be recognized by scanning the entire area of the image. An object is checked and detected only on a lattice scale of a changed area and the plurality of lattice scales or the entire image may also be scanned to recognize the existence of the object of interest. The scanning may be performed in a pyramid way by moving a scanning window pixel-by-pixel while gradually increasing its precision. After the scanning is completed, whether the object of interest exists in the current scene may be reported to the user.

When an object exists in the place under surveillance, the object may be positioned in the lattice scales. First, the lattice scales or the entire image is scanned in the pyramid way and information about the position of and information about the size of a discovered object of interest are stored in a memory. Next, information about the number of objects, the position information, and the size information can be minimized and can be provided to an end user in various ways.

Figure 5:
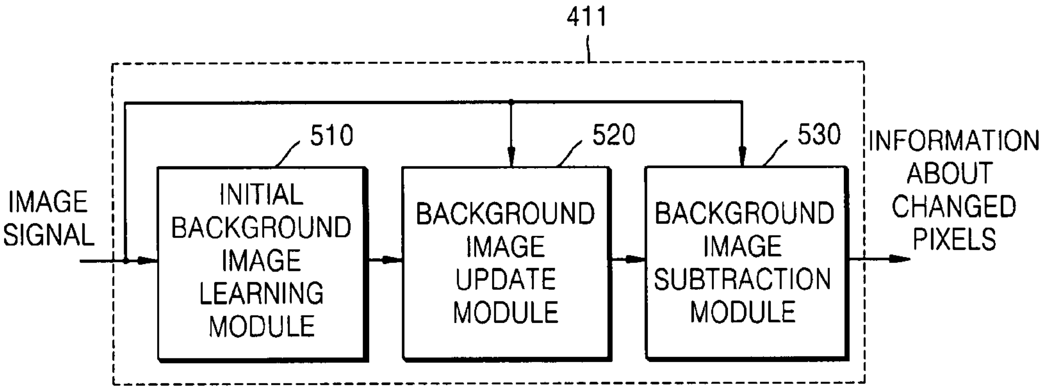
FIG. 5 is a schematic block diagram of a change detection module of the calculation unit illustrated in FIG. 4.

FIG. 5 is a schematic block diagram of the change detection module 411 of the calculation unit 320 illustrated in FIG. 4.

Referring to FIG. 5, the change detection module 411 includes an initial background image learning module 510, a background image update module 520, and a background image subtraction module 530.

The initial background image learning module 510 receives digital image signals and learns and obtains a background image model using several images. The background image update module 520 updates the background image model by reflecting on a change in an input image. The background image subtraction module 530 subtracts a background image from a new image in order to extract changed pixels from the new image. The background image is modeled as a Gaussian mixture model based on Equation 1 and Equation 2 and is updated based on Equation 3, Equation 4, Equation 5, and Equation 6.

$$P(X_t) = \sum_{i=1}^{K} \omega_{i,t} * \eta(X_t, \mu_{i,t}, \Sigma_{i,t}) \quad (1)$$

$$\eta(X_t, \mu, \Sigma) = \frac{1}{(2\pi)^{n/2}|\Sigma|^{-1/2}} e^{-1/2(X_t-u)'\Sigma^{-1}(X_t-u)} \quad (2)$$

$$\omega_{i,t} = (1-\alpha)\omega_{i,t-1} + \alpha M_{i,t} \quad (3)$$

$$\mu_t = (1-\rho)\mu_{t-1} + \rho X_t \quad (4)$$

$$\sigma_t^2 = (1-\rho)\sigma_{t-1}^2 + \rho(X_t-\mu_t)^T(X_t-\mu_t) \quad (5)$$

$$\rho = \alpha\eta(X_t|\mu_i, \sigma_i), \quad (6)$$

where $\omega_{i,t}$ is a weight of an $i^{th}$ Gaussian component at time t, $\mu_{i,t}$ and $\Sigma_{i,t}$ are mean and covariance matrices, K is the number of Gaussian components, $M_{i,t}$ is a map indicating whether or not pixels are changed, and $\alpha$ and $\rho$ are learning factors.

Figure 6:
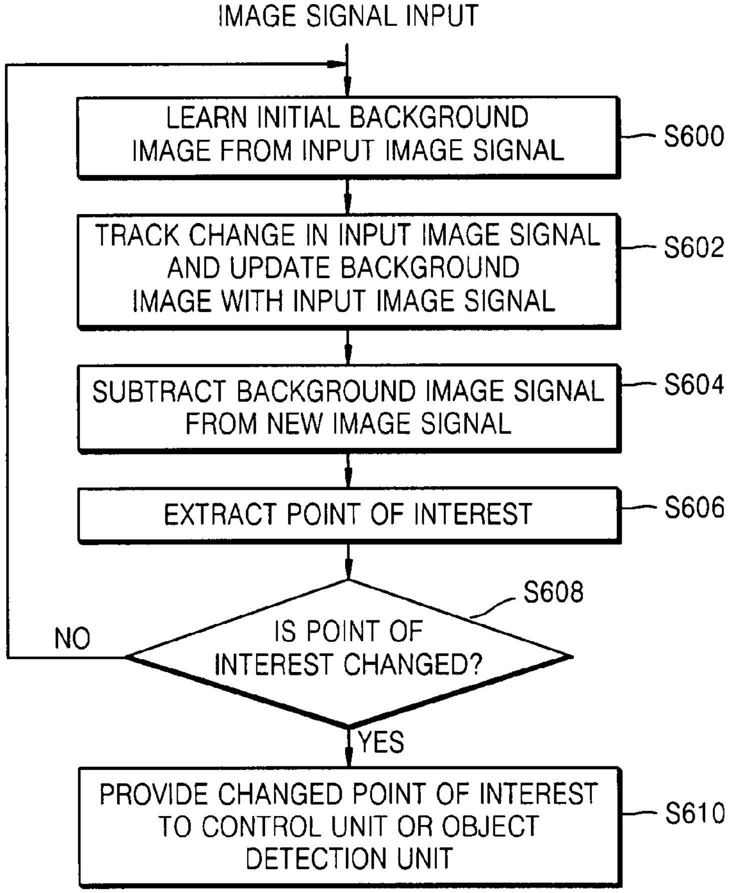
FIG. 6 illustrates a flowchart of a change detection method according to an embodiment of the present invention.

FIG. 6 is a flowchart illustrating a change detection method according to an embodiment of the present invention.

Referring to FIG. 6, the change detection unit 410 learns an initial background image from an input image signal in operation S600. The change detection unit 410 tracks a change of the input image signal and updates the initial background image by reflecting on the input image signal in operation S602. The change detection unit 410 subtracts a background image signal from a new image signal in operation S604 and extracts a point of interest from the new image signal in operation S606. The change detection unit 410 determines whether a set point of interest of a user is changed in the extracted point of interest in operation S608. If the change occurs, the change detection unit 410 provides the changed point of interest to the control unit 340 or the object detection unit 420 for object detection.

Figure 7:
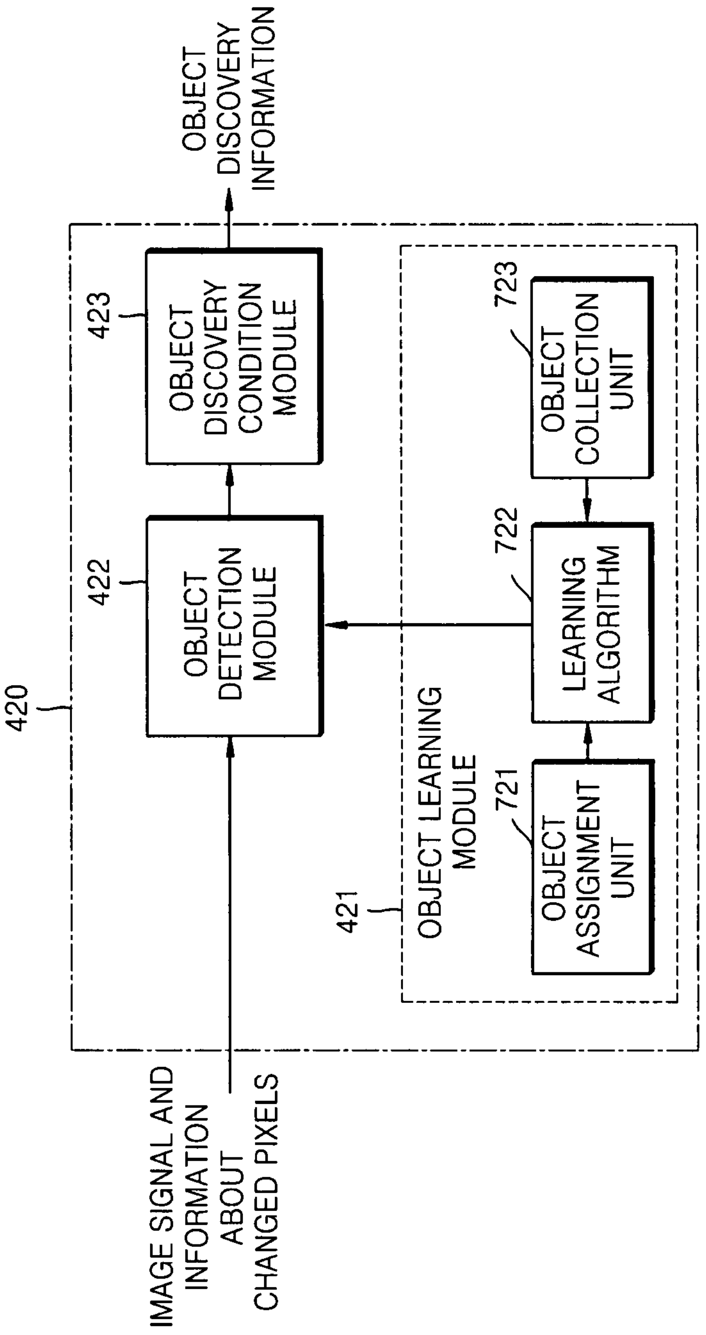
FIG. 7 is a block diagram of an object detection unit of the calculation unit illustrated in FIG. 4.

FIG. 7 is a block diagram of the object detection unit 420 of the calculation unit 320 illustrated in FIG. 4.

Referring to FIG. 7, the object detection unit 420 includes the object learning module 421, the object detection module 422, and the object discovery condition module 423.

The object learning module 421 is a model learning part and conventional pattern recognition methods, e.g., a support vector machine (SVM), Ada Boost, and modifications thereof may be used as a learning algorithm module. Positive samples are provided from an object assignment unit 721 to a learning algorithm 722 and negative samples are provided from an object collection unit 723 to a learning algorithm 722. For example, although not shown in the figures, samples may be collected through the Internet and picture albums. The positive samples are produced by manually extracting an object area (in the form of a bounding box) and the negative samples use the entire area of an image. Features are extracted from each of the samples before being transmitted to the learning algorithm 722. For conventional objects, there are fixed patterns that can be used to determine whether the current images are preferred or not. Those fixed patterns may be used to distinguish a target object from other objects or detect or scan images for searching for a target object class.

The object detection module 422 performs scanning for detecting an object in the input image signal based on an object model obtained from the object learning module 421. Preferably, the scanning may be performed using a pyramid scan module. The object in the input image signal can be detected by checking samples in all possible positions and sizes in the current image.

The object discovery condition module 423 checks if the object detection module 422 discovers a preferred object. If the preferred object is discovered, the object discovery condition module 423 transmits a signal to the control unit 340 and informs the control unit 340 that the preferred object is discovered in the current image.

After feature detection, a pattern learning algorithm such as a SVM, a boost, and modifications thereof may be used to be applied to the object model.

Figure 8:
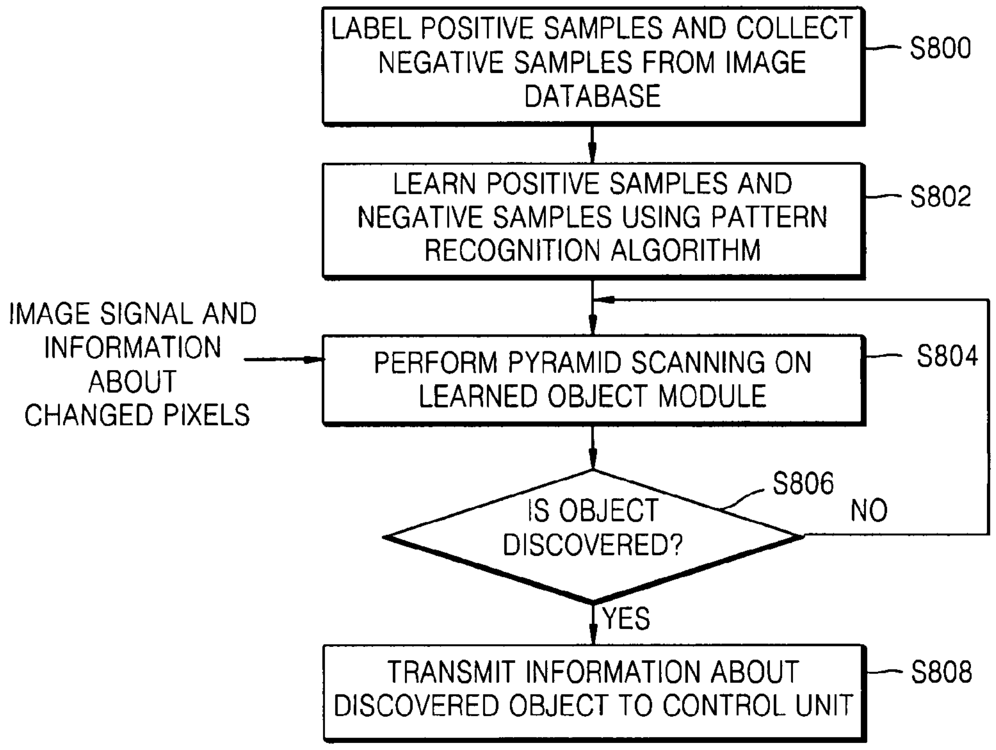
FIG. 8 illustrates a flowchart of a object detection method according to an embodiment of the present invention.

FIG. 8 illustrates a flowchart of an object detection method according to an embodiment of the present invention.

Referring to FIG. 8, the object detection unit 420 classifies positive samples and collects negative samples from a database of images collected from the Internet or photo albums in operation S800. The object detection unit 420 learns the positive samples and the negative samples using the pattern recognition algorithm in operation S802. The object detection unit 420 scans the current input image in a pyramid way based on the learned object model in operation S804 and checks if a set object by the user is discovered in operation S806. If the object is not detected, pyramid scanning is repeated with respect to the next input image. If the object, e.g., a face or head of a person, an animal, a fire, smoke, or an electric light in an on or off state, is detected, the object detection unit 420 transmits information about the objects of interest to the control unit 340 in operation S808. The information includes images obtained by capturing the objects.

Figure 9:
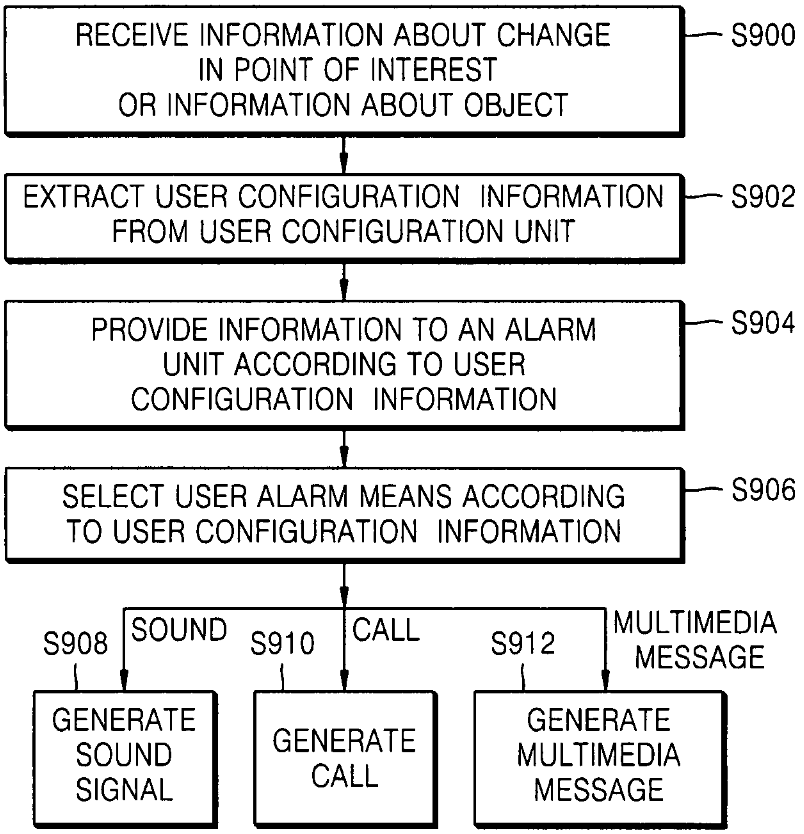
FIG. 9 is a flowchart illustrating a user alarm method in the case of a change in a place, according to an embodiment of the present invention.

FIG. 9 is a flowchart illustrating a method of alarming a user in the case of a change in a place, according to an embodiment of the present invention.

Referring to FIG. 9, the control unit 340 receives information about a change in a point of interest or information about an object that exists in the point of interest in operation S900. Upon receipt of the information, the control unit 340 extracts user setting information that is previously set by the user such as an alarm method or an alarm target such as a phone number or an e-mail address in operation S902, and provides the user setting information to the alarm unit 360 in operation S904.

The alarm unit 360 selects a user alarm means based on the user setting information in operation S906. When the user alarm means is a sound, the sound generation unit 370 generates a sound signal corresponding to alarm information and provides the sound signal to a speaker of the portable terminal. The speaker outputs the sound signal. The user can previously set the type of sound.

When the user alarm means is a call in operation S906, the alarm unit 360 extracts a phone number set by the user. The call unit 380 calls the phone of the user corresponding to the set phone number through a wireless or wired communication network. The phone of the user may be a wired or wireless phone or another portable terminal.

When the user alarm means is a multimedia message in operation S906, the alarm unit 360 extracts a changed image of a place under surveillance or an object image of the point of interest that exists in an image of a place under surveillance from the storage unit 330. The multimedia message generation unit 390 converts the changed image or the object image of the point of interest into a multimedia message and transmits the generated multimedia message to the user through the wired or wireless communication network in operation S912. Upon receipt of the multimedia message, the user can be informed of events that are happening in the point of interest.

The user setting unit 350 is configured to allow the user to select an alarm method for a case where a target object emerges or a change occurs in detected images. The user can select at least one of three alarm methods. Although the calculation unit 320 includes both the change detection unit 410 and the object detection unit 420 in the embodiment of the present invention, the calculation unit 320 may include only one of the change detection unit 410 and the object detection unit 420.

In addition, although a specific place is under surveillance using a single portable terminal in the embodiment of the present invention, the present invention may also be applied to a decentralized surveillance system that is used to surveil multiple independent areas or a single large area using several devices. Each of the devices has the same functions and principles as the portable terminal according to the present invention. The devices may be used to independently survey various areas or a single area at various viewing angles.

The present invention can also be embodied as a computer-readable code on a computer-readable recording medium. The computer-readable recording medium is any data storage device that can store data, which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion.

As described above, according to the present invention, a specific place is photographed to generate an image signal and a change in the image signal is detected to generate alarm information for a user, thereby allowing flexible image surveillance according to settings of a user. Moreover, common users can easily perform image surveillance using a conventional portable terminal and problems associated with surveillance for privacy protection areas can be solved.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. A video surveillance method using an integrated circuit comprised in a portable terminal, the video surveillance method comprising:

photographing, by an image sensor, a predetermined place and generating, by the integrated circuit, an image signal corresponding to the predetermined place;

detecting a change in the image signal by calculating, by the integrated circuit, a difference between a current frame and a previous frame of the generated image signal; and generating alarm information, by the integrated circuit, corresponding to the detected change of a configured point of interest in the image signal in order to alarm a user, the point of interest being set by the user, wherein the detecting comprises generating a learned background image model, obtaining a background image from the learned background image model, and subtracting the background image from the generated image signal to extract changed pixels, and detecting the change in the image signal based on the changed pixels.

2. The video surveillance method of claim 1, wherein the generating comprises generating the alarm information corresponding to the detected change of the configured point of interest of the user in the image signal based on previously configured user information in order to alarm the user.

3. The video surveillance method of claim 2, wherein the user information includes at least one of information about a point of interest in the predetermined place, information about an object that exists in the point of interest, information about an object that exists in the predetermined place, and the alarm information.

4. The video surveillance method of claim 1, further wherein the generating comprises generating the alarm information in order to alarm the user when the degree of the change in the configured point of interest of the user is greater than the predetermined threshold.

5. The video surveillance method of claim 1, further comprising detecting, by the integrated circuit based on a pattern learning algorithm, an object from the image signal and determining, by the integrated circuit, whether the detected object satisfies an object discovery condition, wherein generating comprises generating the alarm information in order to alarm the user when the detected object satisfies the object discovery condition, wherein the detecting the object classifies positive samples and collects negative samples from a database of images, learns positive samples and negative samples by the pattern learning algorithm.

6. The video surveillance method of claim 1, wherein the alarm information includes at least one of a sound, a call, and a multimedia message.

7. The video surveillance method of claim 6, wherein when the alarm information is sound, generating comprises generating a sound signal corresponding to the detected change in the image signal and outputting the generated sound signal through a speaker of the portable terminal.

8. The video surveillance method of claim 6, wherein when the alarm information is the call, generating comprises extracting a phone number that is previously configured by the user and calling a wired or wireless terminal corresponding to a set phone number of the user.

9. The video surveillance method of claim 6, wherein when the alarm information is the multimedia message, generating comprises converting the changed image signal into a multimedia message and transmitting the generated multimedia message to a terminal that is previously configured by the user through a wired or wireless communication network.

10. The method of claim 1, wherein the learned background image model is learned by the generated image signal, and updated by reflecting on detecting the change in the image signal.

11. The method of claim 1, wherein the learned background image model is pre-learned.

12. A non-transitory computer-readable storage medium storing program instructions for controlling an integrated circuit to perform a program for implementing the video surveillance method on a computer, the method comprising;

photographing a predetermined place and generating, by the integrated circuit, an image signal corresponding to the predetermined place;

detecting a change in the image signal by calculating, by the integrated circuit, a difference between a current frame and a previous frame of the generated image signal; and generating alarm information, by the integrated circuit, corresponding to the detected change of a configured point of interest of a user in the image signal in order to alarm the user, the point of interest being set by the user, wherein the detecting comprises generating a learned background image model, obtaining a background image from the learned background image model, and subtracting the background image from the generated image signal to extract changed pixels, and detecting the change in the image signal based on the changed pixels.

13. A portable terminal which comprises an integrated circuit, the integrated circuit configured to:

photograph a predetermined place via an image sensor comprised in the integrated circuit; generate an image signal corresponding to the predetermined place;

calculate a difference between a point of interest, set by a user, in both a current frame and a previous frame of the generated image signal and detecting a change in the image signal based on the calculation result;

generate alarm information corresponding to the detected change in the image signal and output the generated alarm information; and receive user information that includes at least one of information about the point of interest, which is set by the user, in the predetermined place, information about an object that exists in the set point of interest, information about an object that exists in the predetermined place, and the alarm information, wherein the integrated circuit receives the user information and generates the alarm information according to the user information, wherein the integrated circuit generates a learned background image model, obtains a background image from the learned background image model, and subtracts the background image from the generated image signal to extract changed pixels, and detects the change in the image signal based on the changed pixels.

14. The portable terminal of claim 13, wherein the integrated circuit is configured to detect whether the degree of a change in the configured point of interest of the user included in the image signal is greater than a predetermined threshold, and when the degree of the change in the configured point of interest of the user is greater than the predetermined threshold, the integrated circuit generates the alarm information corresponding to the detected change in the image signal.

15. The portable terminal of claim 14, wherein the integrated circuit is configured to detect an object that exists in the point of interest and determining whether the detected object satisfies an object discovery condition when the degree of the change in the point of interest is greater than the predetermined threshold, and when the detected object satisfies the object discovery condition, the integrated circuit generates the alarm information corresponding to information about the object that exists in the point of interest.

16. The portable terminal of claim 13, wherein the integrated circuit is configured to detect an object that exists in the image signal and determining whether the detected object satisfies an object discovery condition, and when the detected object satisfies the object discovery condition, the integrated circuit outputs information about the object that exists in the image signal to the control unit and the integrated circuit generates the alarm information corresponding to the detected change in the image signal, wherein the integrated circuit is further configured to classify positive samples and collect negative samples from a database of images, learn positive samples and negative samples by the pattern learning algorithm.

17. The portable terminal of claim 13, wherein the integrated circuit is further configured to:

generate a sound signal according to the change in the image signal and output the generated sound signal through a speaker of the portable terminal;

extract a phone number that is previously set by the user and call a wired or a wireless terminal corresponding to the extracted phone number; and convert the changed image signal into a multimedia message and transmit the generated multimedia message to a terminal that is previously configured by the user through a wired or wireless communication network.

18. The portable terminal of claim 13, further comprising a storage unit configured to store at least one of the user information, the generated image, and the changed image of the predetermined place.

19. A portable terminal comprising a camera and a video surveillance apparatus, wherein the video surveillance apparatus, which is implemented in an integrated circuit, comprises:

an image generation unit comprising an image sensor configured to photograph a predetermined place and generate an image signal corresponding to the predetermined place;

a calculation unit comprising a processor portion configured to calculate a difference between a point of interest, set by a user, in both a current frame and a previous frame of the generated image signal and detecting a change in the image signal based on the calculation result;

a control unit comprising a processor portion configured to generate alarm information corresponding to the detected change in the image signal and outputting the generated alarm information; and an alarm unit configured to alarm the user according to the alarm information output from the control unit, wherein the calculation unit is further configured to generate a learned background image model, obtain a background image from the learned background image model, and subtract the background image from the generated image signal to extract changed pixels, and detect the change in the image signal based on the changed pixels.

20. A video surveillance system comprising:

a portable terminal;

a first terminal connected with the portable terminal through a wireless network; and a second terminal connected with the portable terminal by a communication server through a wired or wireless network, wherein the portable terminal which comprises an integrated circuit, the integrated circuit configured to:

photograph a predetermined place via an image sensor comprised in the integrated circuit;

generate an image signal corresponding to the predetermined place;

calculate a difference between a point of interest, set by a user, in both a current frame and a previous frame of the generated image signal and detecting a change in the image signal based on the calculation result; and generate alarm information corresponding to the detected change in the image signal and output the generated alarm information to the first terminal or the second terminal, wherein the integrated circuit is further configured to generate a learned background image, obtain a background image from a learned background image model, and subtract the background image from the generated image signal to extract changed pixels, and detect the change in the image signal based on the extracted pixels.

* * * * *